March 16, 1926.

F. D. TOLLIVER 1,576,760

THRASHING MACHINE

Original Filed May 9, 1919    8 Sheets-Sheet 1

INVENTOR.
Fred D. Tolliver
by
his ATTY.

March 16, 1926.

F. D. TOLLIVER

THRASHING MACHINE

Original Filed May 9, 1919    8 Sheets-Sheet 4

1,576,760

INVENTOR.
Fred D. Tolliver
his ATT'Y.

March 16, 1926.
F. D. TOLLIVER
1,576,760
THRASHING MACHINE
Original Filed May 9, 1919    8 Sheets-Sheet 5
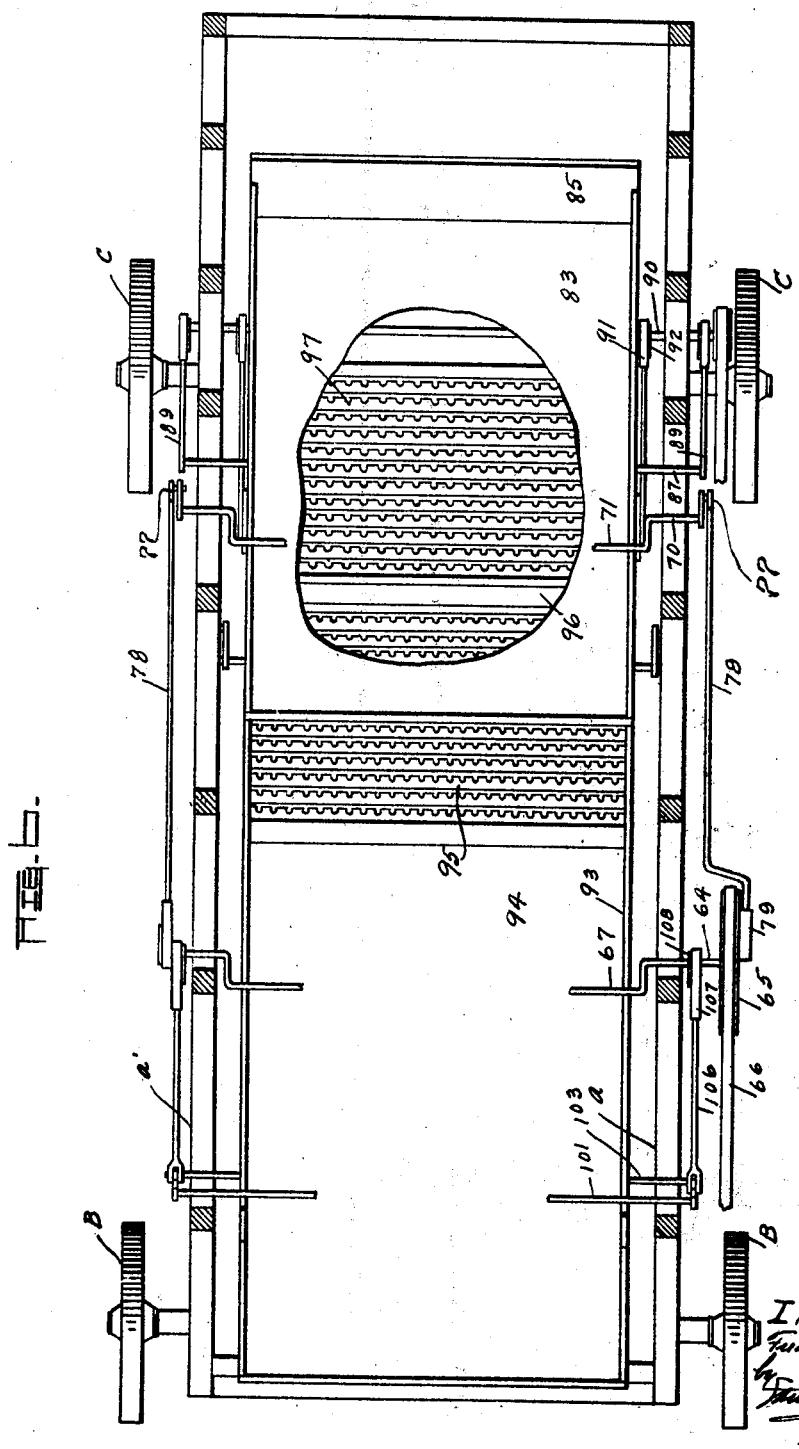

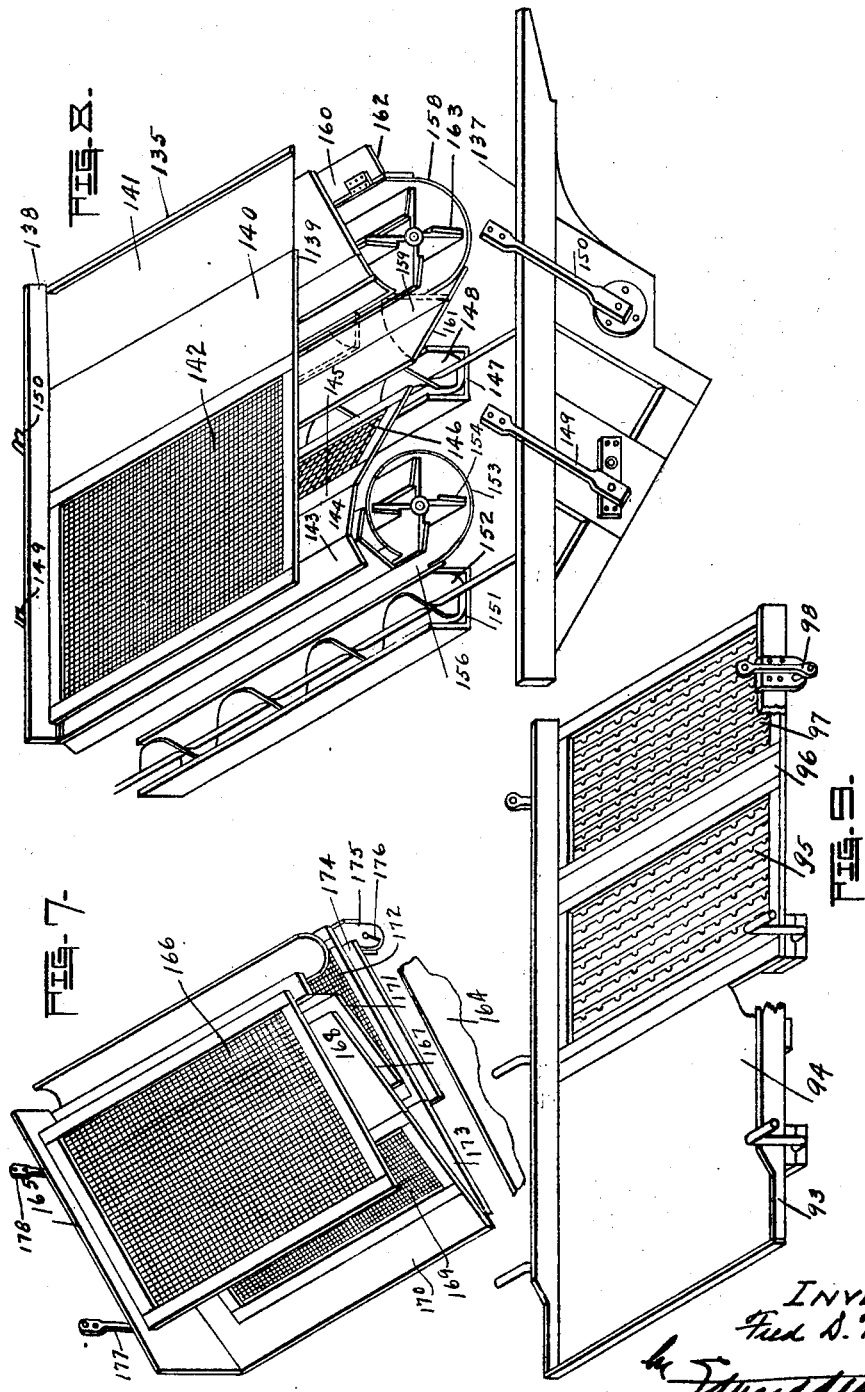

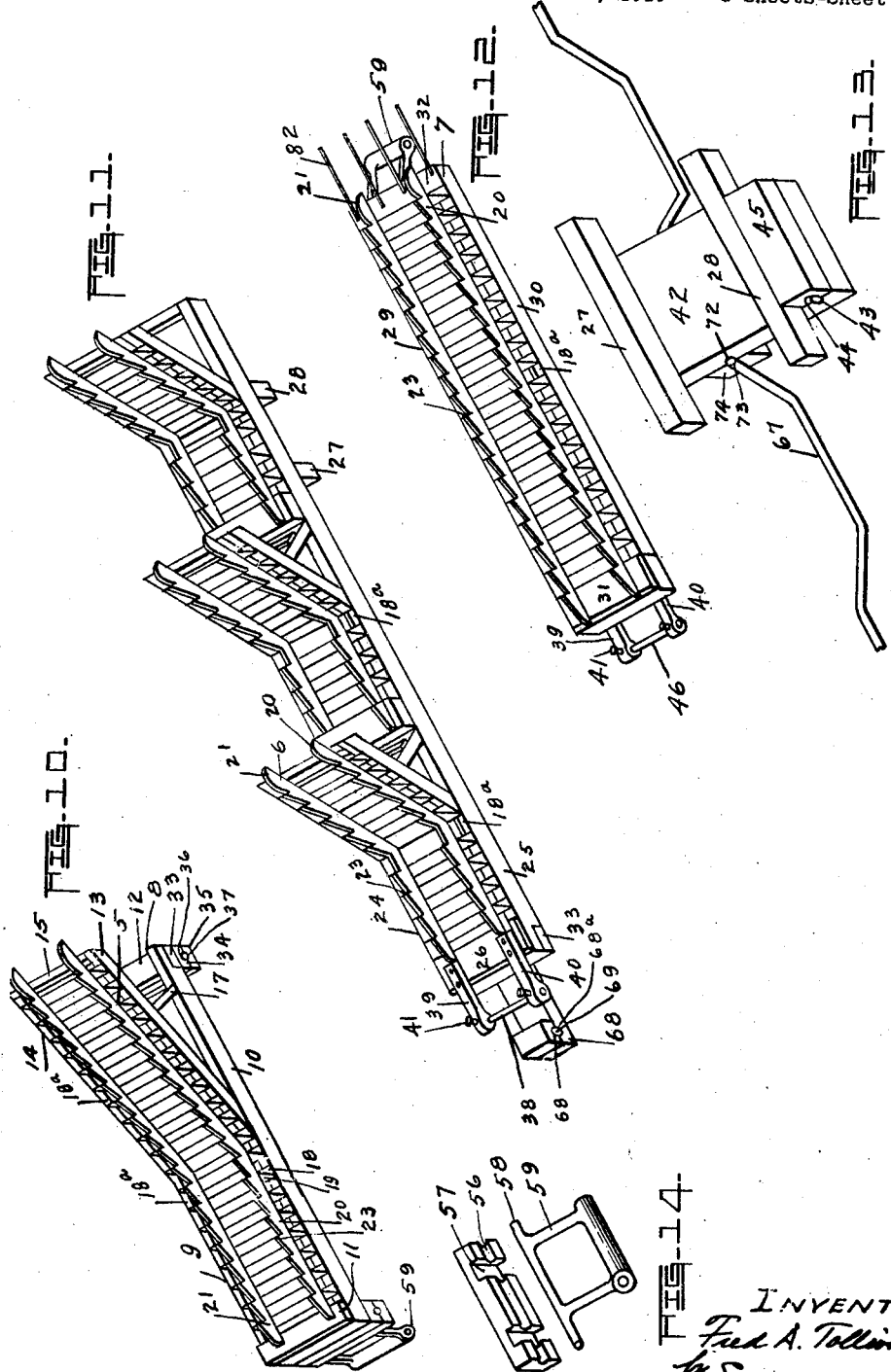

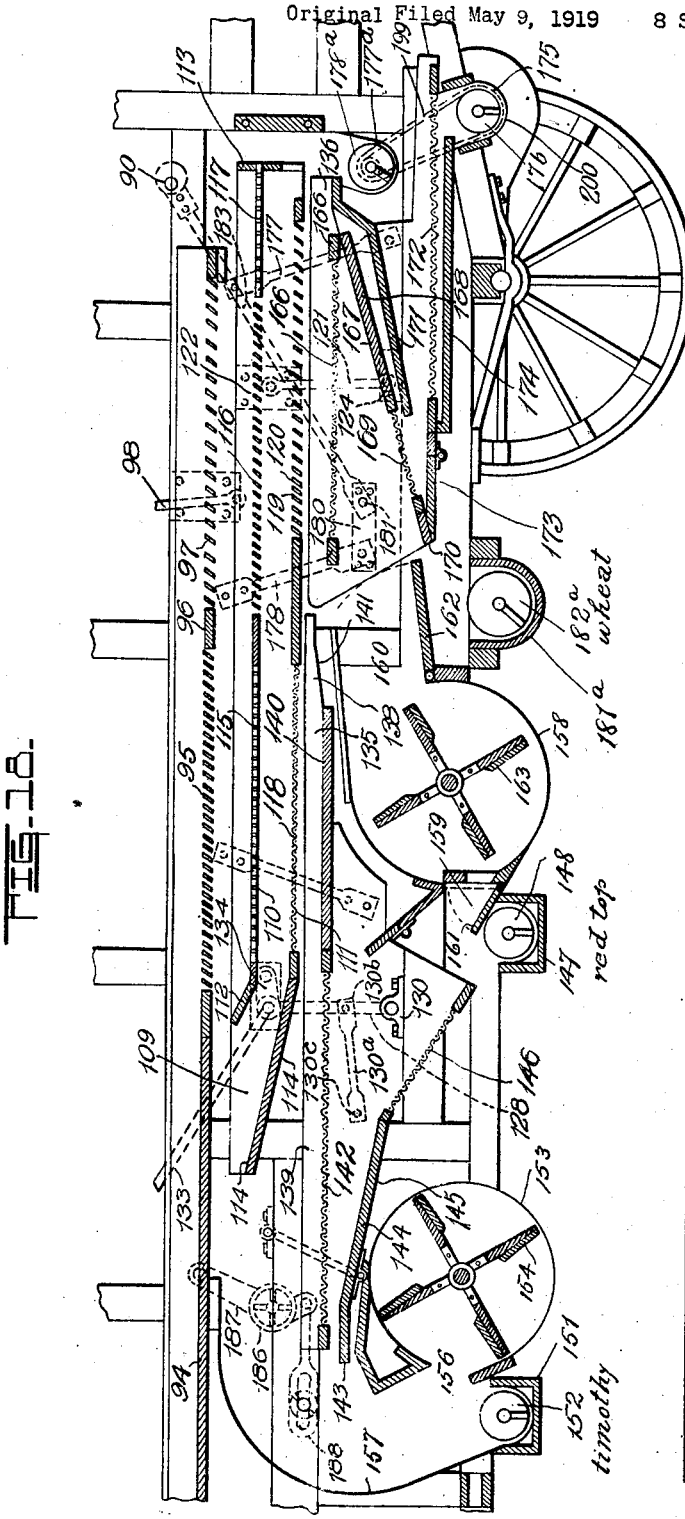

Patented Mar. 16, 1926.

1,576,760

UNITED STATES PATENT OFFICE.

FRED D. TOLLIVER, OF HENRY, ILLINOIS.

THRASHING MACHINE.

Application filed May 9, 1919, Serial No. 295,884. Renewed May 3, 1924.

*To all whom it may concern:*

Be it known that I, FRED D. TOLLIVER, a citizen of the United States, residing at Henry, in the county of Marshall and State of Illinois, have invented certain new and useful Improvements in Thrashing Machines, of which the following is a specification.

This invention relates to improvements in thrashing machines, and has for its general object the provision of a thrashing machine which is highly efficient in operation at all times and capable of effecting a thorough separation of the grain or seed material from the straw and chaff, when used for thrashing and separating a large variety of grains or seeds.

More specifically stated, an object of the invention is the provision of a thrashing machine which handles a mixture of several distinct varieties of grains, effectively thrashes and separates the several varieties of grains or seeds in a single operation, and, at the same time, frees each separated variety of grain or seed from chaff and other foreign matter. Thus, a mixture of unthrashed grains and seeds of many varieties may be fed to the machine and the operation thereof will be effective to thrash and separate all the grain or seed from the straw, next separate the several varieties of grains or seeds from each other, and finally deliver clean grain or seed of each variety which will be entirely free from chaff or other extraneous matter. This operation is effected without waste of valuable grain or seed and results in the discharge of thoroughly cleaned thrashed straw, which is a feature of great economic importance in the art.

Another object of the invention is the provision of a thrashing machine which is adapted to grade grain or seed of the same variety, this being attained by separating the heavier grain from the lighter grain.

With the above and other objects in view, the invention consists in certain improved constructions, arrangements and combinations of parts hereinafter described in a preferred form and specifically pointed out in the claims at the end of the specification.

Referring to the accompanying drawings which illustrate a structural embodiment of the invention—

Fig. 6 is a longitudinal horizontal sectional elevation taken over the grain pan, with parts broken away to show the interior construction;

Fig. 7 is an isometric view of the main shoe;

Fig. 8 is an isometric view of the red top and timothy shoe;

Fig. 9 is an isometric view of the grain pan;

Fig. 10 is an isometric view of the front sub-section of the straw rack;

Fig. 11 is an isometric view of the intermediate sub-section of the straw rack;

Fig. 12 is an isometric view of the rear sub-section of the straw rack;

Fig. 13 is a detailed view of one of the straw rack cranks and the bearing therefor;

Fig. 14 is a detailed view of one of the straw rack rocker arms;

Fig. 16 is a fragmentary longitudinal sectional elevation of a modified form of the invention.

Fig. 17 is a side view of one of the side bars of the chaffing shoe.

Fig. 18 is a vertical longitudinal sectional view, similar to Fig. 3 and on a larger scale, showing the screening devices.

Fig. 19 is a detail view illustrating the dusting bars of the riddle 119.

The same characters of reference designate the same parts throughout the several views.

Figure 1:
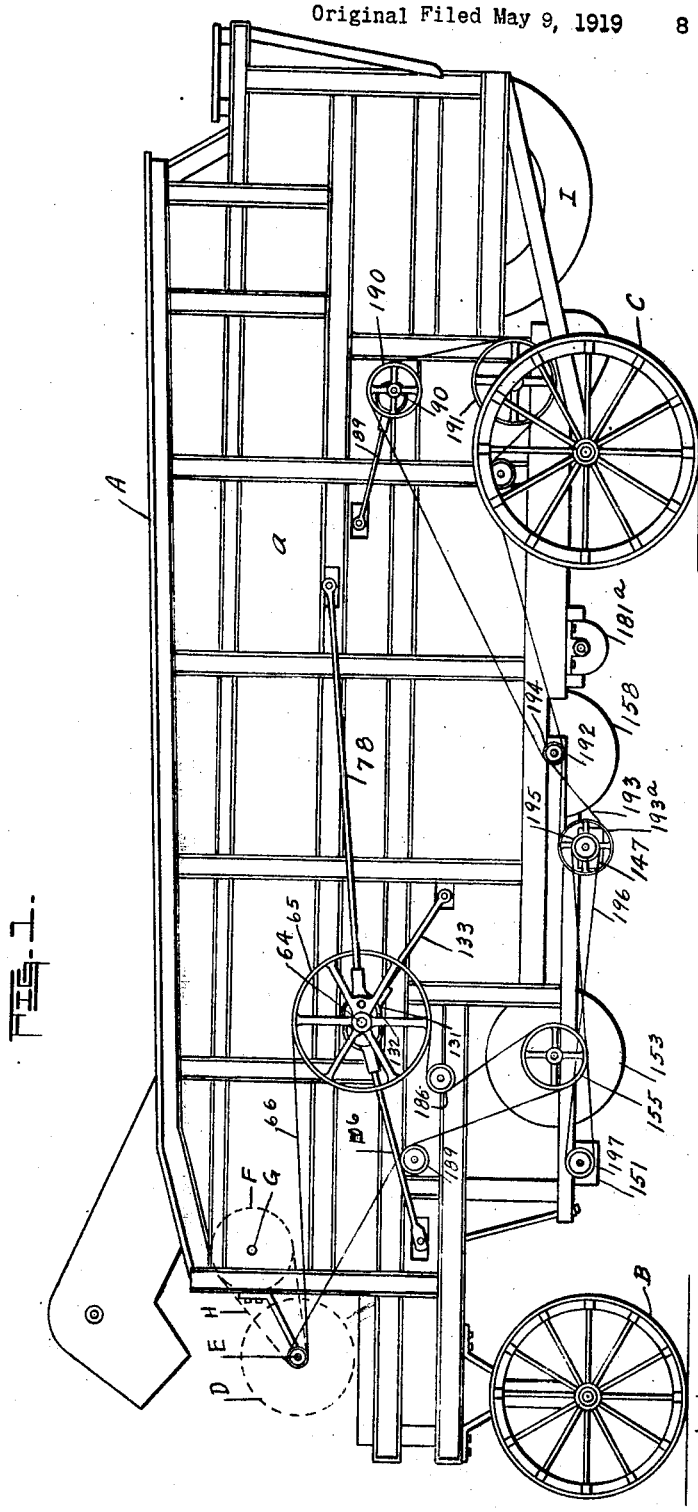
Fig. 1 is a side elevation of a thrashing machine constructed in accordance with the present improvements.
Figure 2:
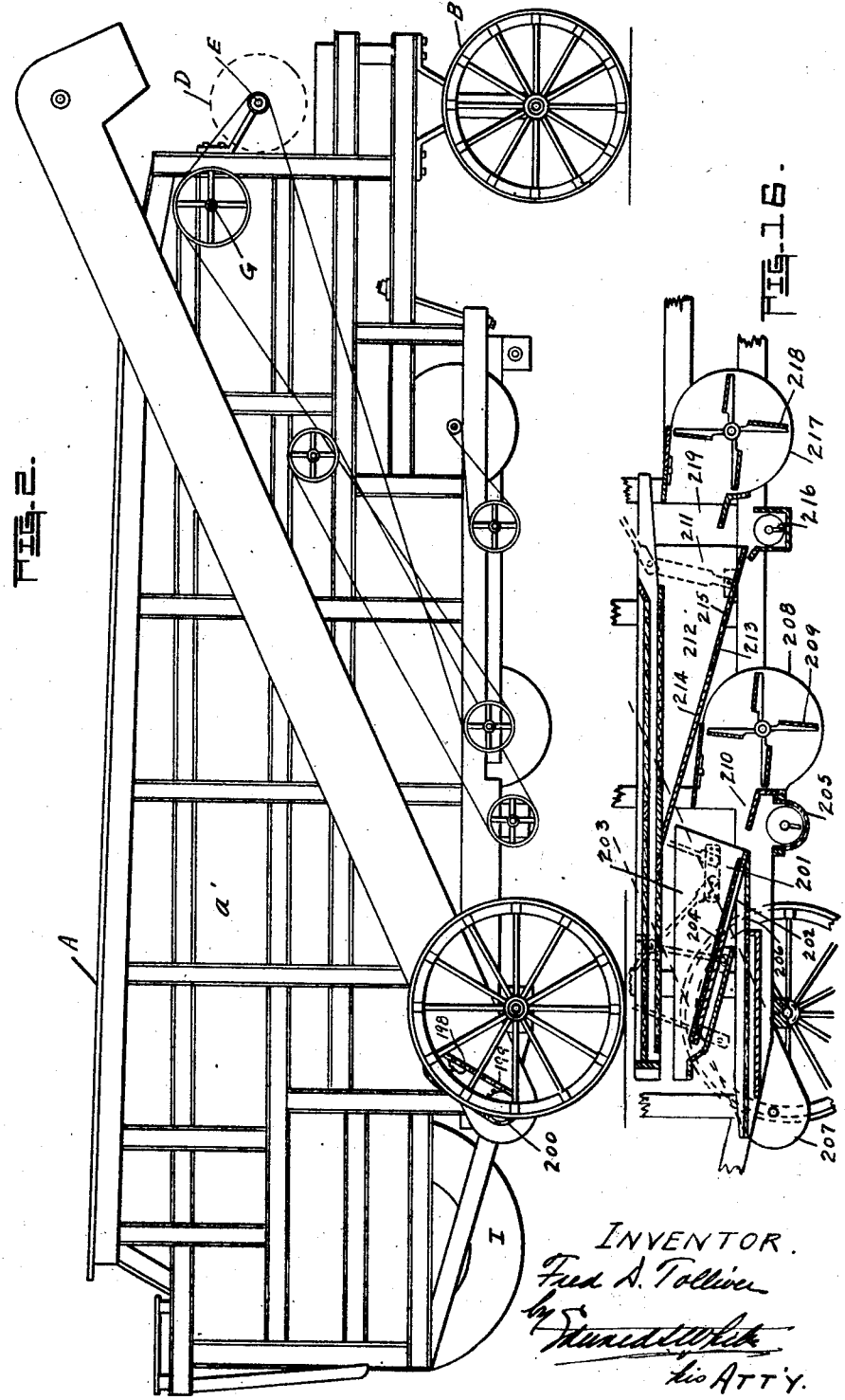
Fig. 2 is a side elevation of the same viewed from the side opposite to that of Fig. 1.

As shown in the drawings, the thrashing machine may be of conventional design in its framework or main body construction, and it embodies a suitable body A, having side walls $a$, $a'$, formed of vertical and horizontal si'ls in any approved manner. The main body of the thrashing machine is supported upon a pair of front wheels B and a pair of rear wheels C. At the front of the machine there is mounted a thrashing cylinder, indicated diagrammatically at D and of any preferred construction, the said cylinder being driven by the main power shaft E and working in conjunction with a beater F on a parallel shaft G driven by a belt and pulley connection H with said main power shaft E. The construction of the cylinder D and beater F form no part of the present improvements, and it will be sufficient to state that working in conjunction with each other, said cylinder and beater perform the operation of thrashing out the seed or grain from the unthrashed material fed to them at the front of the machine, and that this operation is followed by a delivery of the grain mixed with straw, chaff, etc., to the straw rack hereinafter described. At the rear of the body A, a blower indicated diagrammatically at I is provided, said blower being of any preferred construction adapted to catch the straw discharged from the straw rack and blow the straw beyond the rear end of the machine, in a manner well known in the art.

The straw rack of the present invention is especially designed to promote efficient and thorough separation of the grain or seed from the straw, preliminary to the final cleaning and separation of the grain into several varieties or grades. For this purpose the straw rack is constructed so as to effect a violent agitation of the mixture of grain or seed, and straw deposited thereupon, by imparting to such mixture agitating movements both in the normal direction of travel of the mixture upon the rack and also vertically, or transversely, with respect to such normal direction of travel. By this means, a clean straw, substantially free from grain or seed is effected at the discharge end of the rack and practically no grain is wasted. Notwithstanding the violent agitation imparted by the rack, seed or grain only is permitted to fall to the separating, riddling and cleaning mechanisms beneath, and all the straw is advanced by the rack to the proper point of discharge. As shown in the drawings, see particularly Figures 3, 4, 5, and 10 to 14 inclusive, the straw rack embodies a longitudinally and vertically agitatable straw supporting and grain or seed separating surface, which is preferably constructed in the following manner: The straw supporting and grain separating surface is made up of a plurality of rack sections, there being in the present embodiment four longitudinally extending rack sections 1, 2, 3 and 4, each one of which comprehends a front sub-section 5, an intermediate sub-section 6 and a rear sub-section 7.

Figure 3:
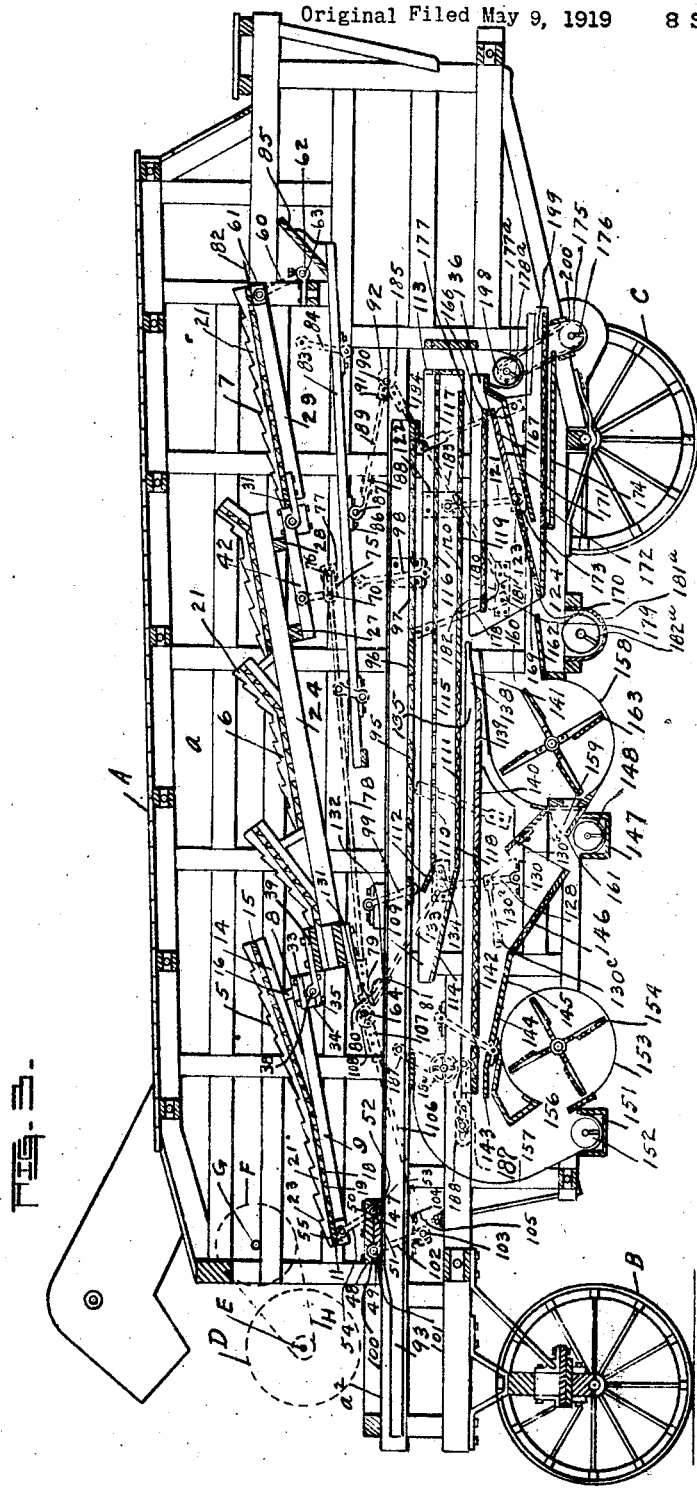
Fig. 3 is a longitudinal vertical sectional elevation of the thrashing machine.

The several longitudinal sections 1 to 4 inclusive are alike in their details of construction, and hence a description of one will suffice for all. The front sub-section 5 of a longitudinal rack section embodies a substantially rectangular frame 8, formed of spaced longitudinal bars 9—10 joined at their front and rear ends by transverse connecting bars 11 and 12, the front bar 11 overlying the top edges of the bars 9—10 and the rear bar 12 extending beneath the bottom edges of said bars 9—10, as shown more particularly in Figure 10. Secured to bars 9—10 substantially midway between their front and rear ends are diagonally-upwardly-extending bars 13—14 which are connected at their rear ends by a transverse bar 15. The rear ends of the bars 13—14 may be braced by suitable inclined bracing bars 16, 17, extending to the bars 9—10 and connecting bars 13—14 therewith. Between that portion of the frame bars 9—10 in front of the inclined bars 13—14 and also between said inclined bars 13—14 are positioned and secured at suitable intervals the cross-bars 18 having inclined faces 19 as shown. In order to secure strength and rigidity of construction, a number of said cross bars 18ª are made substantially wider in cross-section than the rest of them. The above construction provides a continuous grate-like surface which inclines upwardly from front to rear. Secured in any suitable manner to the several cross bars of this grate-like surface is a pair of longitudinally-extending spaced rack bars 20—21, the respective top edges of which are provided with teeth 23, as shown. Preferably, the lateral distance between the pair of bars 20—21 is twice the distance between each bar and the adjacent edge of the rectangular frame, this arrangement providing for equal spacing of all the rack bars 20—21, when the four longitudinal sections 1—4 are arranged in juxtaposition to each other. The intermediate sub-sections 6 of a longitudinal rack section is formed of a rectangular frame made considerably longer than the frame of the front sub-section and embodying longitudinal bars 24—25, a front lateral connecting bar 26 and spaced rear lateral connecting bars 27—28. This rectangular frame supports three grate-like surfaces, each one of which is constructed in a similar manner to the corresponding surface of the front sub-section, with the exception that the rear inclined portion of each grate-like surface of the intermediate section is somewhat steeper than the corresponding inclined portion of the front sub-section. Parts of the intermediate sub-section 6 which correspond with parts of the front sub-section 5 are given the same reference numerals. It will be noted that the three inclined portions of the grate-like surfaces of the intermediate sub-section 6 are of progressively decreasing heights, as shown in Fig. 3, but they may be of substantially the same height as shown in Fig. 11, the rear inclined portion being the lowest, as shown. The three pairs of longitudinal rack bars 20—21 of the intermediate sub-section 6 are spaced in the same manner as those of the front sub-section and are in alignment with each other and with the corresponding rack bars of the front sub-section 5. The rear sub-section 7 includes a rectangular frame composed of longitudinal bars 29, 30, joined at the front and rear ends by transverse bars 31, 32, and the cross-bars 18 18$^a$ are spaced at substantially equal distances along the entire length of the frame. Mounted on said cross bars 18—18$^a$ are the usual rack bars 20—21 spaced in the same manner as the corresponding rack bars of the front and intermediate sub-sections and located in line with said corresponding rack bars, as clearly shown in Figure 11 of the drawings.

The several sub-sections of each longitudinal rack section are secured together in the following manner: Mounted on the under face of the rear transverse bar 12 of the front sub-section 5 is a bearing block 33 provided with co-operating bearing sections 34 35, secured together and respectively formed with mating semi-cylindrical transverse bearing grooves 36—37 to provide a cylindrical bearing for a short shaft or pin 38 which is secured at its opposite ends in eyes formed in the ends of spaced longitudinal rods 39—40 secured to the front transverse bar 26 of the intermediate sub-section and projecting forwardly a suitable distance beyond the end of the latter. Set screws 41 are provided in the rods 39—40 for the purpose of holding the pin 38 in the eyes. With this construction, the intermediate sub-section may be readily attached to the front sub-section by first removing the pin 38 from the eyes at the ends of the rods 39—40, next bringing the two sub-sections together so that the eyes register with the cylindrical bearing of the front sub-section, then inserting the pin through the bearing and the eyes, and finally securing the pin in position in said eyes by tightening up the set screws 41. The rear sub-section 7 is attached in somewhat similar manner to the intermediate sub-section. As shown, a longitudinal bearing block 42 is mounted on the under faces of the transverse bars 27—28 of the intermediate sub-section and projects rearwardly beyond the rear transverse bar 28. The upper face of the block adjacent its rear end is formed with a transverse semi-cylindrical groove 43 which co-operates with a similar groove 44 in the lower face of a block 45 mounted on the block 42, said co-operating grooves 43—44 being adapted to receive a transverse pin or shaft 46 secured to the rear sub-section 7 in the same manner as the pin 38 of the intermediate sub-section 6.

As hereinbefore stated, there are in the present instance, four longitudinal rack sections each constructed in the manner above described. Provision is made whereby the several longitudinal rack sections are imparted oscillatory agitating movements both horizontally and vertically, in such manner that the simultaneous vertical and horizontal movements of adjacent longitudinal rack sections are in opposite directions. Thus, a platform for material deposited by the thrashing cylinder, having violent vibratory and agitating characteristics is attained, with the result that a most efficient separation of the grain or seed from the straw is effected and clean straw is discharged at the rear end of the machine, while, at the same time, all of the grain or seed passes to the various riddling, cleaning and separating mechanisms beneath the straw rack. For accomplishing these results, the following mountings and driving connections for the several longitudinal rack sections are provided: Secured to and extending transversely between the longitudinal sills $a^2$ of the side walls $a$ $a'$ of the main body of the thrasher, is a transverse bearing block 47 constructed of upper and lower bearing sections 48—49 which are provided with co-operating bearing grooves 50—51, the latter mutually forming a transverse bearing for the front supporting members of the several longitudinal rack sections, as will presently appear. Mounted in said transverse bearing groove is a shaft 52, and said shaft is adapted to support the lower sleeves 53 of rockers 54 of the several longitudinal rack sections. Each rack section is provided with a rocker 54, there being in the present embodiment four rockers for the four rack sections and the rocker of each section is pivoted in any suitable manner to the front transverse bearing block 55 of the latter. For this purpose, said bearing block is provided with a transverse groove 56 and with communicating short longitudinal grooves 57, the transverse groove being adapted to receive the transverse shank 58 of the rocker, and the short longitudinal grooves 57 the vertical arms 59. The rear ends of the several longitudinal rack sections are similarly supported by rockers 60, the upper ends of which are mounted in bearing blocks 61 secured to the rear ends of said rack sections and the lower ends of which are provided with sleeves 62 fitted on a transverse shaft 63 supported in the frame in any suitable manner.

Figure 4:
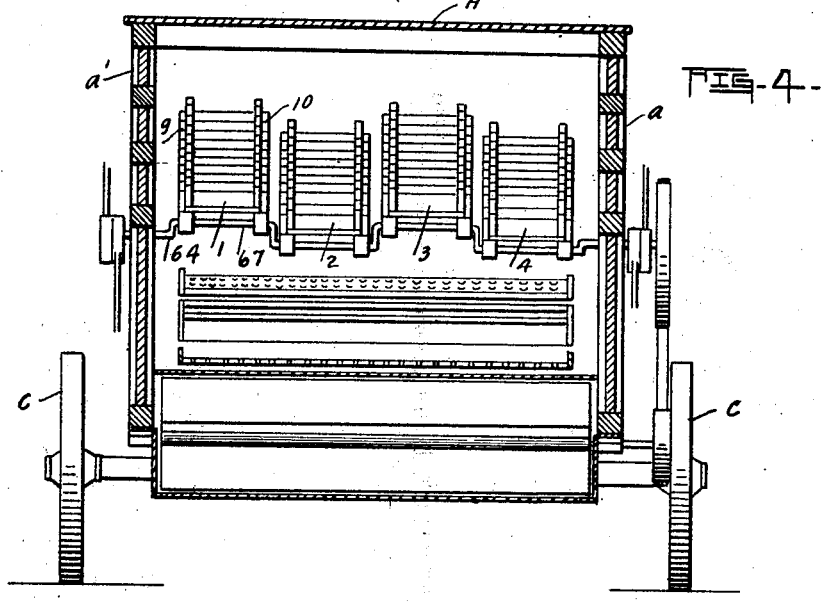
Fig. 4 is a transverse vertical sectional elevation taken in a plane substantially coincident with the front crank.
Figure 5:
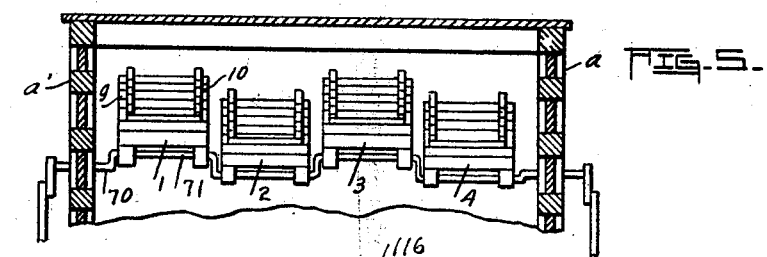
Fig. 5 is a similar transverse vertical sectional elevation taken in a place substantially coincident with the rear crank.

As stated, the several rack sections form a vibratory, agitating straw supporting surface, which is designed to impart a violent agitation to the material deposited upon such surface by the thrashing mechanisms in the front portion of the thrashing machine. This agitation of the several longitudinal rack sections is attained by means of the following drive connections: Journaled in suitable bearings in the side walls *a a'* of the body of the thrashing machine is a crank shaft 64 adapted to be rotated by a suitable driven pulley 65 mounted on the end of said crank shaft and located outside the wall *a* and on the right hand side of the thrashing machine. Said pulley is driven by a belt 66 which passes to the main power shaft E of the machine. The crank shaft 64 is illustrated in Fig. 4 and each crank 67 thereof is adapted to have a driving connection with one of the longitudinal rack sections. For this purpose the intermediate sub-section 6 of each longitudinal rack section is provided with a forwardly extending bearing block 68 provided with a transverse bearing socket 69, formed by co-operating grooves of upper and lower bearing sections 68ª—68ᵇ, which socket 69 receives one of the cranks 67 of said shaft 64. The several cranks 67 of the shaft 64 are so disposed that adjacent cranks are located diametrically opposite to each other, and hence when rotation is imparted to the shaft 64, a vibratory, oscillating motion, both horizontal and vertical, will be transmitted to the four rack sections of the straw rack. The combined vertical and horizontal movement of one rack section in one direction will be accompanied by a concurrent combined vertical and horizontal movement of the adjacent rack section in the opposite direction. The power transmitted by the crank shaft 64 is preferably supplemented by a second crank shaft 70 located rearwardly of said shaft 64, and having its opposite ends suitably journaled in bearings provided in the side walls *a a'*. Crank shaft 70 is constructed similarly to shaft 64, and when the parts are assembled, the cranks 71 of said shaft 70 are disposed in planes parallel with the corresponding cranks 67 of the shaft 64. For transmitting the power of the shaft 70 to the longitudinal rack sections, the longitudinal bearing block 42 of each rack section is provided with a transverse groove 72 formed in its lower face and co-operating with a transverse groove 73 of a supplemental bearing block 74 secured to the lower face of said block 42. The two transverse grooves 72—73 mutually form a bearing socket for the reception of a crank 71 of the shaft 70. Fixed to each end of crank shaft 70 and located outside the walls *a a'*, are short crank arms 75, the outer ends of which are pivoted on transverse pins 76 mounted in blocks 77 fixed at the rear ends of longitudinally extending pitmen 78. At their forward ends, said pitmen 78 are provided with similar heads or blocks 79, which are pivoted upon short transverse pins 80 mounted in the outer ends of crank arms 81 fixed to the opposite ends of the crank shaft 64. In this manner, an oscillatory and vibratory motion of the character hereinbefore described is communicated to all portions of the several longitudinal sections constituting this straw rack. The rear ends of the several sub-sections 7 are provided with rearwardly extending fingers 82 which guide the straw to the point of discharge.

Extending beneath the rear portion of the straw rack is a return and delivering pan 83 (Fig. 6) mounted on vertical rocker arms 84, which are pivoted at their lower ends to said pan and at their upper ends to the side walls *a a'* of the body. Mounted at the rear end of said delivering pan 83 is an inclined board 85 which prevents grain or seed from spilling over the rear end of said pan. Extending transversely beneath the pan and fixed to a transverse block 86 thereof is a shaft 87 which receives at its opposite ends, the heads 88 of pitmen 89. Said pitmen 89 extend rearwardly to a driven shaft 90 and are provided at their rear ends with heads 91 which are pivoted on eccentrics 92 driven by said shaft 90. In this manner an oscillatory, vibratory motion is imparted to the return pan 83.

The separation of the grain or seed from the straw is effected by the straw rack, and the grain or seed drops through the grated bottom of said rack directly onto a grain pan 93 (Fig. 9), or first, onto the delivering pan 83, which owing to its forwardly inclined position, delivers said grain or seed to the forward portion of the grain pan. The grain pan extends longitudinally underneath the straw rack a distance nearly equal to the entire longitudinal dimension of the machine, and receives all the seed and grain material separated by said straw rack. The front portion of said grain pan is formed with a solid bottom 94, which extends approximately one-half the longitudinal dimension of said pan. Next to said solid bottom 94, the grain pan is provided with a riddle 95 formed in the usual manner by securing inclined, toothed transverse bars in spaced relation, to the longitudinal side bars of the pan and to this first riddle the grain and seed caught by the pan 83 are delivered, and all of such material passes down through or rearwardly over this riddle. Adjacent to the riddle 95 and separated therefrom by a solid transverse board 96 is a similarly constructed riddle 97, having the transverse, notched bars thereof spaced apart a slightly greater distance than the bars of the preceding riddle, to form a riddle of somewhat coarser mesh. The preliminary separation of the grain and seed into two classes, according to size is effected upon the grain pan 93 and for accomplishing this result, a vibratory motion is imparted to said pan in substantially horizontal planes by means of the following connections. As shown, the rear and intermediate portions of the pan 93 are mounted on depending vertical hangers 98, 99 respectively, which hangers are suitably pivotally secured at their lower ends to the pan and at their upper ends to supports provided in the side walls a a' of the machine body. Mounted in the transverse bearing socket 100 of the transverse bearing block 47 is a shaft 101 having depending hangers 102 which are pivoted at their lower ends on a shaft 103 supported in a bearing block 104 extending transversely beneath and secured to the forward portion of the grain pan 93. Pivoted on the opposite ends of said shaft 103 are the heads 105 of pitmen 106 which extend to the crank shaft 64 and are provided adjacent said shaft 64 with socketed heads 107 pivoted on eccentrics 108 driven by said crank shaft 64. Upon rotation of the crank shaft 64, the above described draft connections impart to said grain pan a vibratory reciprocating motion in substantially horizontal planes. The seed and grain deposited upon the pan 93 is agitated and advanced therealong toward the rear end of the thrashing machine. During this movement the finer seed is separated from the coarser seed by the first riddle 95 and passes between the interstices of the latter onto the forward portion of the chaffing shoe located immediately beneath the grain pan. The coarser seed, however, passes onto the next riddle 97 and drops between the interstices thereof to the rear portion of said chaffing shoe. Any matter of coarser dimensions than seed or grain is shaken by the pan and discharged off the tail end of the latter. It is evident from the foregoing that my invention comprises means for preliminarily grading the grain and more or less fine seeds, so that, regardless of what disposition is made of the fine seeds, they are not present with the wheat or other grain to interfere with the rapid passage of the latter through the various grain riddles and screens, and the grain winnowing operation is not impeded.

Figure 15:
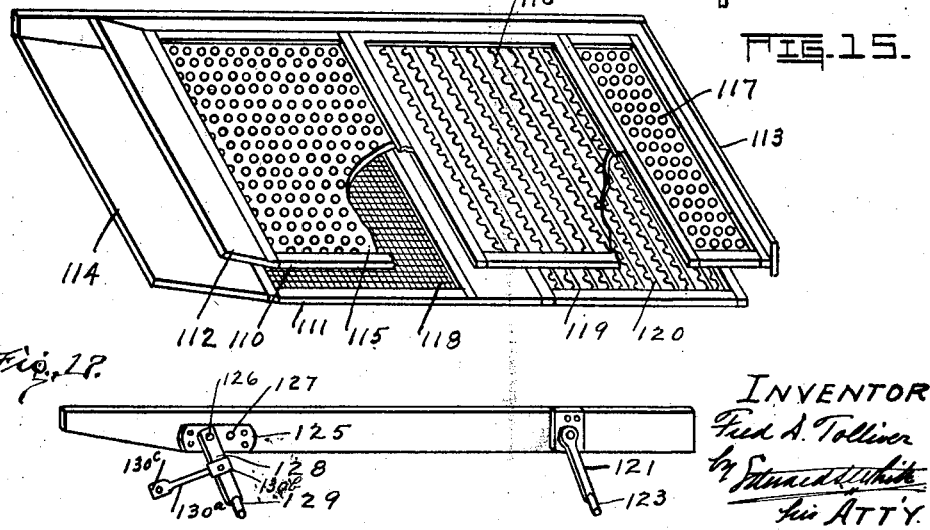
Fig. 15 is a isometric view of the chaffing shoe.

The chaffing shoe 109 (Fig. 15) is located directly beneath the riddle portion of the grain pan and is provided with upper and lower horizontal frames 110, 111, the upper frame of which is provided at its front end with a forwardly projecting inclined board 112, which prevents grain and seed deposited thereupon from spilling out, and is also provided at its rear end with a vertical tail board 113, preventing spilling of grain and seed from the tail end of the chaffing shoe. The lower frame 111 is formed at its front end with a forwardly projecting inclined retaining plate 114, which extends beyond the front edge of the inclined plate 112. The details of construction of the chaffing shoe are illustrated more particularly in Figure 15 of the drawings, and as shown therein, the front portion of the upper frame 110 is provided with a riddle 115 consisting preferably of a foraminous plate, the holes of which are relatively small in diameter so as to permit small seed, such as timothy, red top and the like, to pass through, and prevent the passage of larger seed such as grain, wheat or oats or clover, which larger seed passes through the meshes of a riddle 116 constructed in the same manner as the riddles 95, 97 of the grain pan and located rearwardly of said riddle 115. At the extreme end of the upper frame 110 there is provided a foraminous tail plate 117, having its holes of relatively larger diameter than the holes of plate 115, whereby grain may pass through said holes to the lower frame 111 of the chaffing shoe. The lower frame 111 of the said shoe is formed with a front riddle 118, consisting of a sheet of woven wire mesh having interstices of sufficient dimension to permit the passage of the finer grass seeds hereinbefore specified, but to retain a large part of chaff and other extraneous matter, and the rear portion of said lower frame 111 is provided with a riddle 119, the inclined bars 120 of which are constructed in the same manner as the inclined bars of the riddles 116, 95 and 97, but are adapted to have their inclination with respect to the frame 111 varied so as to provide an adjustment of the interstices between the various bars of the riddle. This adjustment is for the purpose of regulating the riddle so that the passage of grain of a predetermined size will be permitted, whereas material of a larger size will be discharged or shaken off the end of the chaffing shoe and may be effected by any suitable means adapted to vary simultaneously the angle of the several bars 120 forming the riddle 119. The rear portion of the chaffing shoe is supported upon rocker arms 121 pivoted respectively at their upper ends in bearings 122 formed in the longitudinal side bars of the chaffing shoe and having their lower ends formed with lateral pins 123 which are supported in bearings 124, secured to the side walls a a' of the machine body. The forward ends of the longitudinal side bars of the chaffing shoe are each provided with plates 125 having spaced pins 126—127 and mounted on the front pins 126 are depending rocker arms 128 having at their lower ends laterally extending pins 129 which are journaled in suitable bearings 130 secured to the side walls a a'. Between the upper and lower ends of said rocker arms 128 are pivoted the rear ends of connecting levers 130ª and the forward ends of said connecting levers are pivoted to a shoe adapted for effecting the separation of the finer seeds, as will hereinafter appear. Driven by the crank shaft 64 are eccentrics 131 which are encircled by the heads 132 mounted on the upper ends of pitmen 133. Said pitmen are provided at their lower ends with heads 134 which are pivoted on the rear pins 127 of the plate 125, this train of connections constituting a means for imparting an oscillatory reciprocatory motion to the chaffing shoe.

The smaller seed separated in the front portion of the chaffing shoe drops through the interstices of the chaffing shoe onto a front separating shoe 135 (Fig. 8) and the larger grain which is separated at the rear portion of the chaffing shoe drops onto a rear separating shoe 136 hereinafter designated the main or grain shoe. The front shoe 135 is formed of angular side plates 137—138 which support an elongated transversely extending horizontal upper platform 139, the rear portion of which is constructed of a solid platform 140 terminating at its rear end in an incline 141. This solid platform section of the upper platform extends beneath the riddles 110—111 of the chaffing shoe in position for receiving the small seed sifted through said riddles, and the incline 141 assists in guiding the seed toward the front portion of the front shoe, and prevents spilling at the rear end of the upper platform. The forward portion of said upper platform 139 is constructed of a wire mesh riddle 142 having its interstices of proper dimensions to permit smaller seed to pass therebetween and to prevent passage of larger seed. For example, assuming that a mixture of red top and timothy is deposited on the front shoe, the red top is sifted through the meshes of the riddle 142, whereas the timothy is oscillated over said riddle and shaken off the front end of the latter. Beneath the platform 139 and supported by the side plates 137—138 is an inclined guiding plate 143 formed of upper and lower solid sections 144—145 and an intermediate screen or riddle section 146, the mesh of which is of proper dimensions to permit chaff, dust and other fine extraneous matter to drop onto the ground beneath the machine and to prevent passage of the seed deposited upon the inclined plate 143. Guiding plate 143 extends into the mouth of a conveyor trough 147 in which is mounted a red top seed auger 148 of any approved construction. The trough and auger extend transversely of the machine, and when operated the auger advances the red top seed along the trough to a suitable point of discharge. The front and rear ends of the front shoe are pivoted on the lower ends of front and rear depending rocker arms 149—150 respectively located on each side of the front shoe, and having their upper ends pivoted in suitable bearings formed in the side walls $a$ $a'$ of the machine body. As stated, the levers 130$^a$ are pivoted to the rocker arms 128 of the chaffing shoe. These arms are provided with yokes 130$^a$ adapted to embrace the arms 128 of the chaffing shoe and the ends 130$^b$ of said arms opposite to the yokes are pivoted directly to the respective side plates 137—138 of the front shoe, whereby the oscillatory reciprocatory motion of the chaffing shoe is transmitted to the front shoe, causing the latter to vibrate in unison with the chaffing shoe and effect a separation of the material deposited thereupon. The larger seed, timothy for example, is supported on the riddle 142 and is shaken off the front end of said riddle into the trough 151 of the timothy auger 152, said trough and auger being coextensive with the lateral dimension of the machine, and serving to advance the timothy seed in the trough and to a suitable point of discharge. Located rearwardly of trough 151 is a fan casing 153 within which is mounted a transversely extending fan 154 suitably driven by a pulley 155 as shown. The blast of the fan passes through the front, upwardly inclined, restricted throat 156 of the casing and onto a curved deflecting plate 157, which extends transversely between the side walls of the body of the machine from a point approximate the front wall of the trough 151 to a point above the front end of the front shoe. Said curved deflecting plate 157 serves to catch the blast issuing from the fan and maintain a continuous current of air from a point located in front of the trough 151 to a point above the front end of the front shoe. This blast of air is of sufficient strength to blow away any chaff from the seed falling off the front end of the riddle 142, and also to direct any un-separated smaller seed back onto said riddle for further separation. The discharging timothy seed is thus caught by the blast and thoroughly cleaned of all foreign matter as it falls into its auger trough 151. Located rearwardly of the red top trough 147 is a second fan casing 158, provided with a forwardly extending inclined narrow throat 159 and a rearwardly extending upwardly inclined narrow throat 160. Preferably, the throat 159 is provided with a gate 161 pivotally mounted thereon, but adapted to be swung toward and from the fan casing 158 so as to open or close throat 159 as desired. Similarly, throat 160 is provided with a pivoted gate 162. Within the fan casing 158 is a fan 163, the blast of which passes through the throats 159—160 or either of them as desired, and the current of air from the throat 159 serves to blow away the chaff from the red top seed directed by the inclined plate 143 into its auger trough 147.

The rear or main shoe 136 is constructed of angular side plates 164—165, which support a removable horizontal top screen 166, beneath which is located a forwardly and downwardly inclined platform 167 having an upper solid section 168 disposed adjacent to a lower dust riddle 169; beyond the dust riddle 169 is a delivering plate 170. Beneath the solid portion 168 of said inclined platform is a similarly inclined platform 171. Extending horizontally below platforms 167—171, is a weed and buckhorn screen 172 having at its forward end a solid hinged section 173, to which the screen 169 is connected, whereby the screen 169 and hinged section 173 may be shifted in unison. Directly beneath said weed screen 172 is a horizontal seed board 174 co-extensive with said screen 172, and having its free end projecting into the mouth of the trough 175 of the tail auger 176.

The main shoe is supported at its rear end by side depending hangers 177 having their lower ends suitably pivoted to the shoe and their upper ends suitably pivoted in bearings in the side walls $a$ $a'$, and the front end of the main shoe is supported in similar depending hangers 178, the upper ends of which are pivoted to the walls $a$ $a'$ and the lower ends of which are pivoted on the front pins 179 of bearing plates 180 secured to the side plates 164—165 of the main shoe. Mounted in said plates 180 are rear pins 181, on which are pivoted the heads 182 of pitmen 183, extending to the driven shaft 90. Said pitmen 183 are provided with heads 184 which encircle eccentrics 185 driven by said shaft 90. This construction provides a means for imparting a reciprocatory, vibratory motion to said main shoe.

In thrashing red top and timothy, the buckhorn is deposited upon the screen 166, and with the other tailings, passes through said screen 166 to the screen 169, and thence to the dust riddle 172, where it is separated from the dust and other seed tailings, which drop to the seed board 174, and is finally shaken off the rear end of said screen 172 from which it drops to the ground. It is most desirable to effect a separation of this buckhorn seed for it is of no value whatever, and if mixed with the red top, timothy or grain, would greatly deteriorate the quality of the valuable seeds.

Behind the top screen 166 is an upper auger casing 177$^a$ in which works a tailings auger 178$^a$, and the tailings from the screen 166 are deposited in said auger trough 177$^a$; similarly, the tailings from weed screen 172 are deposited in the auger trough 175. The auger in said trough 175 serves to deliver the tailings to the receiving end of the usual conveyor, not shown, mounted in a casing 179, and extending diagonally to the front end of the machine. At the discharge end, said conveyor casing is provided with the usual spout which delivers the tailings to the unthrashed material at the front feeding end of the thrashing machine. This prevents any waste whatever in the operation of the machine.

As stated, any large grain passes from the chaffing shoe to the main shoe just described. The large grain is thoroughly agitated on the top screen 166 thereof, and the larger grain drops off the front end of said screen 166 into the trough 181$^a$ of a grain auger 182$^a$, co-extensive with the lateral dimension of the machine and extending to a suitable delivering point. The falling grain is acted upon by the blast from the rear end of the fan casing 158 and is thoroughly cleaned of chaff, dust, etc. before it drops into the grain auger. The buckhorn passes through the meshes of the screen 166 and riddle 169 and is finally thrown out of the machine at the rear end of the horizontal riddle 172. The tailings are deposited in the auger troughs 175—177$^a$ and delivered back to the conveyor.

In thrashing wheat alone, it is sometimes best to remove the screen 166 so that the wheat drops directly from the chaffing shoe to the inclined section 168. The dust riddle 169 may be dropped on its hinge, and a cheet screen substituted therefor. The cheet screen is of proper mesh to permit the cheet to drop through the interstices thereof onto the ground, whereas the wheat is delivered over the inclined delivering plate 170 to the auger trough 181$^a$.

Although any suitable driving connections may be provided for the various instrumentalities of the improved thrashing machine, the parts are preferably driven in the following manner. As shown, the front crank shaft 64 is provided with a pulley 65, which receives its power from a belt 66 passing to the main driving shaft E. Said belt 66 passes from the pulley 65 around a belt tightener pulley 186 mounted on a suitable rocker arm 187 and adapted to be manually controlled by a slotted handle 188 (Fig. 3), and thence to the fan pulley 155 and back over an idler pulley 189 to the main drive shaft E. The rear driving shaft 90 may receive its power from the suitable belt connection, not shown, with the main driving shaft E, and is provided with a pulley 190 over which a belt passes first to the pulley 191 of the upper tail auger 178, thence over an idler pulley to a small pulley 192 mounted on the shaft of the fan 163. The red top auger 148 is driven by a belt 193 which passes from a pulley 193$^a$ on the auger shaft to a pulley 194 on the shaft of the fan 163. Mounted on the shaft of the auger 148 is a pulley 195 having a crossed belt connection 196 with a pulley 197 on the shaft of the auger 152. Fixed on the shaft of the upper tail auger 178 is a sprocket shown in dotted lines in Fig. 3. Said sprocket 198 drives chain 199, the latter passing to a sprocket 200 on the shaft of the lower tail auger 176.

In the modification illustrated in Fig. 14 of the drawings, the construction of the upper portion of the machine, including the chaffing shoe and other parts superimposed above the chaffing shoe, is exactly similar to the machine hereinbefore described. Beneath the chaffing shoe, however, two grain shoes are provided, a rear grain shoe 201 formed of side angular plates 202—203, which support a cheet screen 204, the cheet screen separating the cheet from the grain which is delivered into the grain auger trough 205. The cheet passes to the horizontal dust screen 206, and thence to the tail auger 207. Mounted in front of the grain auger 205 is a fan casing 208, in which is positioned a fan 209; the blast of the fan is delivered through a throat 210 and acts on the grain falling into the auger trough 205 to separate the chaff from the grain. The rear grain shoe is suitably mounted on rocker arms and vibrated with a reciprocatory motion in the same manner as the rear shoe hereinbefore described. In the front of the machine, in place of the red top and timothy shoe, there is mounted a shoe 211 formed of side plates 212, which support an inclined chute plate 214 having a cheet screen section 215, through which the cheet may pass to the ground. Suitable drive connections are provided for imparting a vibratory motion to said front screen. In front of the front screen 211 is a grain auger 216, and mounted in front of the grain auger 216 is a fan casing 217, in which works a fan 218. The blast of the fan is delivered through a throat 219 to the grain passing down over the inclined chute plate 214.

Assuming that the modified form of thrashing machine is used for the thrashing of wheat alone, the heavy grade of wheat seed will pass through the front end of the chaffing shoe onto the front grain shoe and there be separated from cheet and chaff, and will finally be delivered by the front auger 216. The lighter grade of wheat will pass onto the inclined chute plate 204, and after separation from cheet thereon, will pass into the rear grain auger 205. The two fans 209 and 218 act on the grain at the front and rear ends of the machine as it is delivered into the respective front and rear augers, and thoroughly clean the grain from all chaff and extraneous foreign matter. The tailings from the rear shoe pass into the tail augers in the manner hereinbefore described.

Should there be any buckhorn deposited on the horizontal screen 206, it will be delivered over the lower tailings auger to the ground at the rear end of the machine.

I am aware that heretofore it has been proposed, in the winnowing of grain, to separate first the chaff and then fine material and then proceed with the winnowing of the grain. My invention perfects the thrashing operation and utilizes it for such purposes and renders the subsequent and separate use of such winnowing machines unnecessary to a large extent. Also it enables the thrasher to handle the thrashed material in greater volume and more rapidly.

What is claimed is:

1. In a thrashing machine for handling and separating a mixture of different sizes of grains or seeds, the combination with means for separating the mixture of grains from the straw, a preliminary grain and seed separating mechanism receiving such mixture from the straw-separating mechanism and embodying means for effecting a separation of the larger grains from the smaller grains and for delivering such separated grains to different points of discharge, and grain cleaning and separating mechanisms located in position for receiving grain independently from the several discharging points of said preliminary grain and seed separating mechanism.

2. In a thrashing machine for handling and separating a mixture of different sizes of grains or seeds, the combination with means for separating the mixture of grains from the straw, a preliminary grain and seed separating mechanism receiving such mixture from the straw-separating mechanism and embodying means for effecting a separation of the larger grains from the smaller grains and for delivering such separated grains to different points of discharge, secondary grain cleaning and separating mechanisms located in position for receiving grain independently from the several discharging points of the preliminary grain and seed separating mechanism, an independent conveying means for each secondary grain cleaning and separating mechanism and receiving grain discharged therefrom, and means for directing blasts of air through the grain discharging from the several secondary cleaning and separating mechanisms.

3. In a thrashing machine for handling and separating a mixture of different sizes of grains or seeds, the combination with means for separating the mixture of grains from the straw; a preliminary grain and seed separating mechanism located beneath said straw-separating means, said mechanism including a plurality of superposed agitatable platforms, each provided with relatively coarse and relatively fine sieve-surfaces respectively located at the opposite ends of the platform and positioned whereby the relatively fine sieve surfaces of the several platforms are all located at the same ends of the latter, and the relatively coarse sieve surfaces are located at the opposite ends of the latter, a grain cleaning and separating mechanism in position to receive grain from the superposed relatively fine sieve surfaces and another grain cleaning and separating mechanism in position to receive grain from the superposed relatively coarse sieve surfaces.

4. In a thrashing machine for handling a mixture of grain and grass seed, the combination with means for effecting a separation of the mixture of grain and seed from the straw and for discharging such mixture independently from the straw, of a preliminary grain and seed separating mechanism receiving such discharged mixture and operable to separate the grain from the grass seed and to discharge the grain and grass seed at different points, a grain separating and cleaning mechanism in position for receiving the discharged grain, and a structurally independent grass seed cleaning and separating mechanism in position for receiving the discharged grass seed.

5. In a thrashing machine for handling a mixture of grain and grass seed of different sizes, the combination with means for effecting a separation of the mixture of grain and seed from the straw and for discharging such mixture independently from the straw, of a preliminary grain and seed separating mechanism receiving such discharged mixture and operable to separate the grain from the grass seed and to discharge the grain and grass seed at different points, a grain separating and cleaning mechanism in position for receiving the discharged grain, a structurally independent grass seed cleaning and separating mechanism in position for receiving the discharged grass seed and embodying means for separating the different sizes of grass seed and for directing the seprarated seeds to different points of discharge.

6. In a thrashing machine for handling a mixture of grain and grass seed of different sizes, the combination with means for effecting a separation of the mixture of grain and seed from the straw and for discharging such mixture independently from the straw, of a preliminary grain and seed separating mechanism receiving such discharged mixture and operable to separate the grain from the grass seed and to discharge the grain and grass seed at different points, a grain separating and cleaning mechanism in position for receiving the discharged grain, a structurally independent grass seed cleaning and separating mechanism in position for receiving the discharged grass seed and embodying riddling mechanisms for separating the different sizes of grass seed and for directing the separated seeds to different points of discharge.

7. In a thrashing machine for handling a mixture of grain and grass seed, the combination with means for effecting a separation of the mixture of grain and seed from the straw and for discharging such mixture independently from the straw, of a preliminary grain and seed separating mechanism receiving such discharged mixture and operable to separate the grain from the grass seed and to discharge the grain and grass seed at different points, a grain separating and cleaning mechanism in position for receiving the discharged grain, a structurally independent grass seed cleaning and separating mechanism in position for receiving the discharged grass seed, and means for directing a blast of air through the discharging grass seed.

8. In a thrashing machine for handling a mixture of grain and grass seed of different sizes, the combination with means for effecting a separation of the mixture of grain and seed from the straw and for discharging such mixture independently from the straw, of a preliminary grain and seed separating mechanism receiving such discharged mixture and operable to separate the grain from the grass seed and to discharge the grain and grass seed at different points, a grain separating and cleaning mechanism in position for receiving the grain from said preliminary grain and seed separating mechanism, and for discharging the cleaned grain at a single point, a structurally independent cleaning and separating mechanism in position for receiving the discharged grass seed and embodying means for separating the different sizes of grass seed and for directing the separated grass seeds to discharging points at opposite ends of the grass seed separating mechanism, and a blower in position for directing blasts of air both through the discharging grain and the grass seed discharging at one end of its separating mechanism.

9. In a thrashing machine for handling a mixture of grain and grass seed of different sizes, the combination with means for effecting a separation of the mixture of grain and seed from the straw and for discharging such mixture independently from the straw, of a preliminary grain and seed separating mechanism receiving such discharged mixture and operable to separate the grain from the grass seed and to discharge the grain and grass seed at different points, a grain separating and cleaning mechanism in position for receiving the grain from said preliminary grain and seed separating mechanism, and for discharging the cleaned grain at a single point, a structurally independent cleaning and separating mechanism in position for receiving the discharged grass seed and embodying means for separating the different sizes of grass seed and for directing the separated grass seeds to discharging points at opposite ends of the grass seed separating mechanism, a blower in position for directing blasts of air both through the discharging grain and the grass seed discharging at one end of its separating mechanism and a second blower for directing a blast of air through the grass seed discharging at the opposite end of the grass seed separating mechanism.

10. In a thrashing machine, in combination, a thrashing mechanism, straw separating means permitting the passage therethrough of the grain and fine seeds; a vibrating grain collecting pan for receiving said grain and fine seeds and having a relatively fine riddle for the passage of the finer seeds to preliminarily remove the same from the grain; and means for winnowing the grain after its separation from said finer seeds.

11. In a thrashing machine, in combination, a thrashing mechanism, straw separating means permitting the passage therethrough of the grain and fine seeds; a vibrating grain collecting pan for receiving said grain and fine seeds and having a relatively fine riddle for the passage of the finer seeds to preliminarily remove the same from the grain; means for winnowing the grain after its separation from said finer seeds; and means for separately winnowing and grading said finer seeds.

12. In a thrashing machine, in combination, a thrashing mechanism, straw separating means permitting the passage therethrough of the grain and finer seeds; a vibrating grain collecting pan for receiving said grain and seeds and having a forward imperforate bottom and a coarse riddle at its rear part for the passage therethrough of the grain, and a finer riddle at its intermediate part for the passage therethrough of fine seeds and for the support of the said grain and larger seeds; a vibratory return pan over and forwardly inclined relative to said grain pan and arranged to receive the grain and seeds from the rear part of said straw separating means and deliver the same to said grain pan; a vibratory chaffing shoe arranged beneath said riddles and having upper and lower frames, the upper frame having a front riddle adapted for the passage of smaller seeds and for the support of said grain and of larger seeds and having an intermediate riddle for the passage of a larger grade of said fine seeds and for the support of said grain and large worthless seeds, and having a rear riddle for the passage of said grain and for the support of larger objects, the lower frame of the chaffing shoe having a front riddle adapted for the passage of the smaller seeds and for the support of larger objects and grain and a rear riddle formed of adjustable screening elements and adapted for the passage of grain and seeds not above a size determined by the adjustment of said screening elements; a front vibratory separating shoe arranged under the forward part of the chaffing shoe to receive seeds from the front lower riddle thereof and having a fine riddle adapted for the passage therethrough of the finest seed such as red top, and for the support of larger seed such as timothy which are discharged over the end of said riddle, means for collecting said larger separated seeds; means for collecting said finest separated seed including a dust riddle adapted to support said seed; a main vibratory separating shoe having a changeable riddle and arranged under the rear part of the chaffing shoe to receive grain therefrom; means for collecting the grain from said main shoe including a dust riddle adapted to support the grain; and pneumatic means for blowing away the chaff from said seeds and grain in their passage through the machine.

13. In a thrashing machine, in combination, a thrashing mechanism, straw separating means permitting the passage therethrough of the grain and finer seeds; a vibrating grain collecting pan for receiving said grain and seeds and having a forward imperforate bottom and a coarse riddle at its rear part for the passage therethrough of the grain, and having a finer riddle for the passage therethrough of fine seeds and for the support of the said grain and larger seeds; a vibratory return pan arranged to receive the grain and seeds from the rear part of said straw separating means and deliver the same to the finer riddle of said grain pan; means for cleaning and separating the grain passing over said finer riddle and through said coarser riddle; means for cleaning and separating the seed passing through said finer riddle; mechanism for vibrating the separating elements for the grain and for the seed; and air-blast mechanism cooperating with the separating elements.

14. In a thrashing machine, in combination, a thrashing mechanism, straw separating means, means for collecting the grain and seed from the latter, grain separating means, seed separating means, a relatively fine screen which receives said collected grain and seed and is arranged to operate on the collected material in advance of the operation of said grain separating means and said seed separating means and delivers fine seed therethrough to said seed separating means, and which refuses said grain and other relatively large material and causes the same to pass to said grain separating means, and air-blast mechanism cooperating with said grain and seed separating means.

15. In a thrashing machine, in combination, a thrashing mechanism, straw separating means permitting the passage of grain and seed, a seed riddle permitting the passage of valuable and relatively fine seed to be recovered and acting to support the grain, a grain riddle permitting the passage of the grain, means for collecting the grain and seed from said straw separating means and causing the same to pass to said seed riddle and the remainder then to said grain riddle, means for receiving the material from said seed riddle and separating therefrom the relatively fine seed, means for collecting the separated grain, and suitable air-blast mechanism.

16. In a thrashing machine, in combination, a thrashing mechanism, straw separating means permitting the passage of grain and seed, a seed riddle permitting the passage of valuable and relatively fine seed to be recovered and acting to support the grain, a grain riddle permitting the passage of the grain, means for collecting the grain and seed from said straw separating means and causing the same to pass to said seed riddle and the remainder thence to said grain riddle, successive riddles for receiving the material from said seed riddle and separating therefrom the fine seed in grades, whereby timothy and red top seed may be separately recovered, successive riddles for receiving the grain and material mixed therewith which was refused and supported by said seed riddle and for separating the grain from coarser seeds, means for collecting the separated grain, and suitable air-blast mechanism.

17. In a thrashing machine, in combination, a thrashing mechanism, straw separating means permitting the passage therethrough of the grain and fine seeds; a vibrating grain collecting pan for receiving said grain and fine seeds and having a relatively fine riddle for the passage of the finer seeds to preliminarily remove the same from the grain; a vibrating grain shoe and fan for winnowing the grain after its separation from said finer seeds; and a vibrating seed shoe and fan for separately winnowing and grading the finer seeds.

18. In a thrashing machine comprising a thrashing mechanism and straw separating means permitting the passage throughout of the grain and fine seeds; the improvement characterized by means for receiving said grain and fine seeds and acting to remove preliminarily the fine seeds from the grain, and means for winnowing the grain after its separation from the fine seeds.

19. In a thrashing machine comprising a thrashing mechanism and straw separating means permitting the passage throughout of the grain and fine seeds; the improvement characterized by vibrating means for receiving said grain and fine seeds and acting to remove preliminarily the fine seeds from the grain, and means for winnowing the grain after its separation from the fine seeds.

20. In a thrashing machine comprising a thrashing mechanism and straw separating means permitting the passage throughout of the grain and fine seeds; the improvement characterized by means, comprising a screen which permits the passage therethrough of fine seeds and prevents the passage of grain, for receiving said grain and fine seeds and acting to remove preliminarily the fine seeds from the grain, and means for winnowing the grain after its separation from the fine seeds.

In testimony whereof I have affixed my signature.

FRED D. TOLLIVER.